United States Patent [19]
Gabrielson

[11] 3,953,683
[45] Apr. 27, 1976

[54] INTERRUPTER FOR TELEPHONE SYSTEMS

[75] Inventor: Bruce C. Gabrielson, Huntington Beach, Calif.

[73] Assignee: San/Bar Corporation, Santa Ana, Calif.

[22] Filed: Oct. 29, 1974

[21] Appl. No.: 518,583

[52] U.S. Cl. ............................... 179/84 A; 179/99
[51] Int. Cl.$^2$ ......................................... H04M 3/02
[58] Field of Search ............... 179/99, 84 R, 84 A, 179/18 AD, 84 L, 18 HB, 81 R, 81 C

[56] References Cited
UNITED STATES PATENTS

| | | | |
|---|---|---|---|
| 3,536,852 | 10/1970 | Dolarmore | 179/84 R |
| 3,683,118 | 8/1972 | Vago | 179/84 R |
| 3,766,325 | 10/1973 | Hatfield | 179/84 A |
| 3,818,146 | 6/1974 | Takubo | 179/84 A |

*Primary Examiner*—Kathleen H. Claffy
*Assistant Examiner*—Joseph Popek
*Attorney, Agent, or Firm*—Jackson & Jones Law Corporation

[57] ABSTRACT

A solid state interrupter is described for controlling the visual and audible indicators in telephone systems and more particularly to control the line selection lamps and electromechanical ringers in key telephone sets. The interrupter includes switching means individually connected between a pair of lamp wink terminals, a pair of lamp flash terminals and a pair of ring signal terminals. Each of the switching means includes a control circuit for alternately enabling and blocking the flow of current in the circuit between the associated terminals in response to the application of a predetermined control signal to the control circuit thereof. An oscillator is provided for generating an a.c. reference signal. Suitable dividers and gates are connected between the oscillator and the control circuits of the switching means to control the duty cycle and frequency at which a circuit path is made between the associated terminals. The switching means connected to the ring signal terminals includes means for isolating the ringing signal terminals from the interrupter to eliminate ground current between the two circuits. The isolator means may be in the form of a light sensitive transistor and a light emitting diode so that light emitted from the diode in response to current flow therethrough results in an impedance change across the transistor.

12 Claims, 5 Drawing Figures

INTERRUPTER FOR TELEPHONE SYSTEMS

BACKGROUND OF THE INVENTION:

1. Field of the Invention:

This invention relates to interrupters for use in controlling the visual and audible signals supplied to key telephone sets for use in key telephone systems.

2. Description of the Prior Art:

Key telephone systems provide a group of key telephone sets with access to two or more telephone lines so that an incoming call may be answered or an outgoing call placed on any one of the sets. Also, a call may be held until the appropriate party can answer the same.

Each key telephone set includes a line selection button associated with each line to enable the user to connect the handset (transmitter-receiver) to a selected line. When a call is received on one of the lines a small lamp located beneath the associated line selection button is energized with a signal having a preselected duty cycle and frequency, e.g., 50% on, 50% off at 1 Hz, commonly called a flash signal. An electromechanical ringer in the telephone set is also energized with a signal having another duty cycle and frequency, e.g., two seconds on and four seconds off. Such visual and audible signals apprise the key telephone set users of the incoming call and identify the particular line over which the call is being received.

When a call is answered at one of the key telephone sets the line selection lamp associated with that line is energized with a steady signal to apprise all of the users that that particular line is in the seize or talk condition. When a line is placed in the hold condition by actuation of a hold button at one of the key telephone sets the associated line selection lamp is energized with a so-called winking signal, e.g., a signal having an on duty cycle of seventy-five percent (75%) and a frequency of about 2 Hz.

A source of ten volt 50–60 Hz is normally supplied at the location of the key telephone sets for providing the energy to the line selection lamps. A ringing signal generator having a 110 to 120 volt output at 20–30 Hz is also normally provided at the location of the key telephone sets for furnishing power to the electromechanical ringers in the sets. A line card circuit such as described in U.S. Pat. No. 3,647,983 is connected to each incoming line and to each of the key telephone sets for providing the necessary supervisory and control functions. For example, such line cards include switches for connecting the line selection lamps to the appropriate source of signals, that is, wink, flash and steady signals, and a switch is also provided in the line cards for connecting the source of ringing power to the electro-mechanical ringers in the telephone sets.

An interrupter is connected between the power sources, e.g., 10 volts at 60 Hz and 110 volts at 30 Hz, and the line cards to interrupt the circuit to the power sources in predetermined patterns to provide the lamp wink, lamp flash and ringing signals required from the two separate power sources.

The conventional interrupter employed in the past includes a motor driven cam arrangement for opening and closing sets of contacts. Such electromechanical interrupters may have a limited lifetime due to the wear of the motor, spring, cam and contact surfaces. Furthermore, the current carrying capacity of prior art electromechanical interrupters is limited by the contact rating of the device and therefor more than one interrupter may be required in a key telephone system which employs a large number of telephone sets.

An electronic interrupter has been proposed in U.S. Pat. No. 3,059,061 to S. L. Merkel for establishing several predetermined interruption patterns between a ringing signal source and the telephone sets. This circuit employs transformers for providing electrical isolation between the interrupter circuit and the electromechanical ringers. This interrupter is expensive, complex and bulky due to the large number of components employed and the use of transformers for providing electrical isolation. Furthermore, this interrupter does not control the energy to the line selection lamp to provide the flash and wink signals.

U.S. Pat. No. 3,647,948 to Morris Ribner, et al. discloses a complex solid state circuit for generating telephone supervisory tone and ringing signals for use in electronic switching systems.

A need has long existed for a compact, low cost, reliable interrupter capable of handling high current loads.

SUMMARY OF THE INVENTION

In accordance with the present invention an interrupter is provided for alternately enabling and blocking the flow of current in the circuit between a pair of lamp wink terminals, a pair of lamp flash terminals and a pair of telephone ringing signal terminals for controlling the visual and audible indicators in key telephone sets. The interrupter includes first, second and third switching means. Each switching means includes a pair of output terminals and a control circuit and is arranged to permit the flow of current in the circuit between the output terminals thereof in response to the application of a first control signal to the control circuit thereof and to block the flow of current in the circuit between the terminals in the absence of the control signal.

The interrupter includes means for connecting the output terminals of the first, second and third switching means to the lamp wink, lamp flash and ringing signal terminals, respectively. The interrupter further includes an oscillator for generating an a.c. reference signal having a preselected frequency. Control means are connected between the oscillator and each of the switching means to apply a control signal to the respective control circuit for a predetermined time period and at a preselected frequency for controlling the duty cycle and frequency that the circuit is made between the lamp wink, the lamp flash and the ringing signal terminals. The third switching means is preferably arranged to provide electrical isolation between the output terminals thereof and the control circuit to prevent ground current from flowing between the source of ringing signals and the interrupter.

Figure 1:
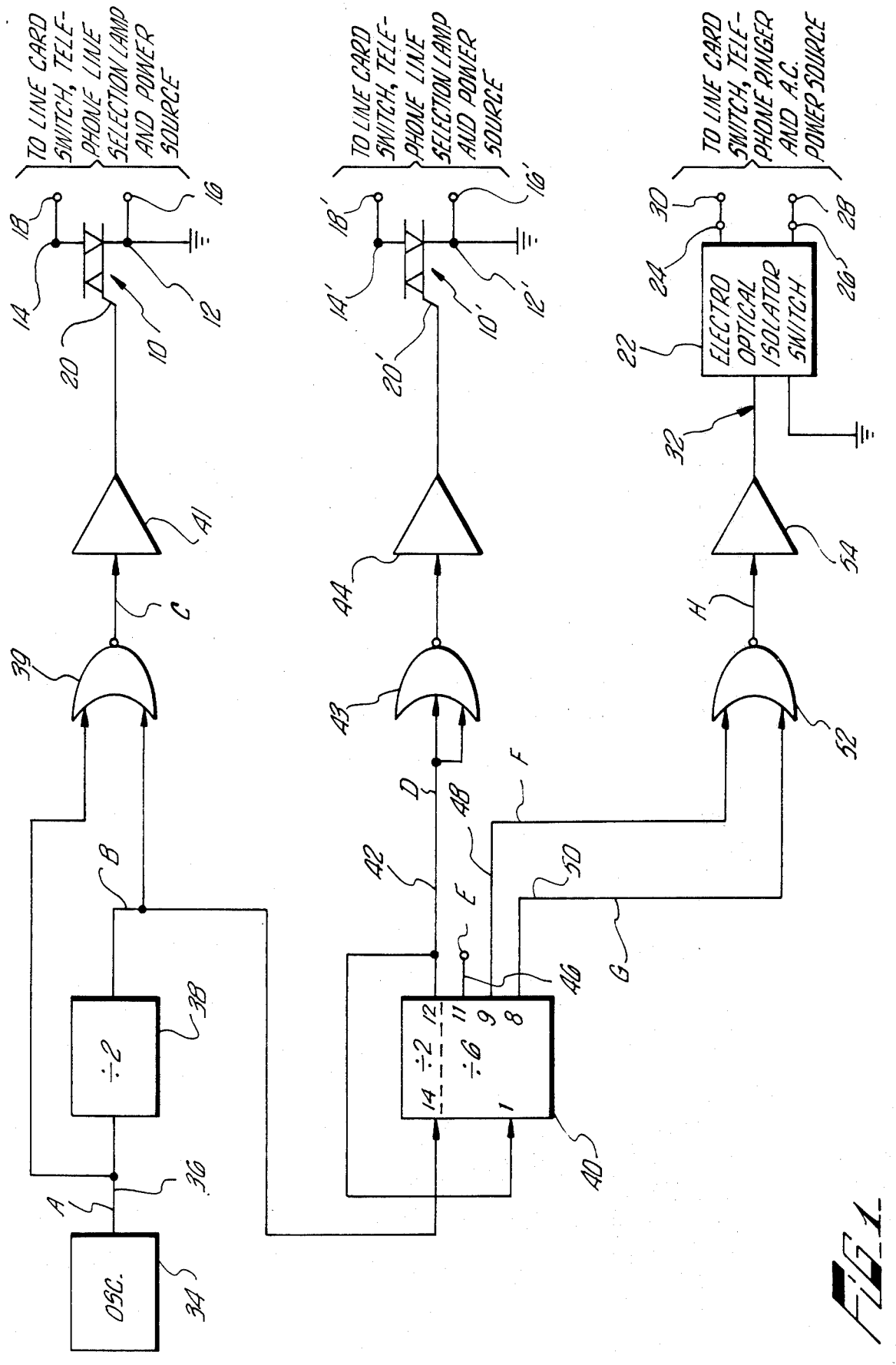
FIG. 1 is a block diagram of a solid state interrupter constructed in accordance with the present invention.

DESCRIPTION OF THE PREFERRED EMBODIMENT:

Referring now to FIG. 1, the interrupter includes a first switching means in the form of a gate controlled semiconductor switch 10 manufactured, for example, by the General Electric Company under the trademark, "TRIAC." The switch 10 includes a pair of output terminals 12 and 14 connected to a pair of lamp wink terminals 16 and 18, respectively. The semiconductor switch 10 includes a gate electrode 20 which functions as a control circuit to permit the flow of current in the circuit between the output terminals 12 and 14 in response to the application thereto of a control signal which is positive with respect to the output terminal 12. In the absence of such a control signal the switch 10 blocks the flow of current in the circuit between the output terminals 12 and 14 in a well known manner. A second gate controlled semiconductor switch 10' has its output terminals 12' and 14' connected to the lamp flash terminals 16' and 18'. The switch 10 includes a gate electrode 20'. The two switches 10 and 10' are identical.

An electro-optical isolator switch 22 has a pair of output terminals 24 and 26 which are connected to the ring signal terminals 28 and 30 as illustrated. The switch 22 includes a control circuit 32 and is arranged to respond to the application of a control signal to the circuit 32 to close the circuit between the output terminals thereof and provide an open circuit between the output terminals in the absence of a control signal as will be explained in more detail.

An oscillator 34 provides an a.c. reference signal on output lead 36 which is in the form of a square wave having a frequency of 4 Hz. The square wave output signal from the oscillator 34 is divided by two by means of a divider 38. A two input positive NOR gate 39 receives the output signals from the oscillator 34 and the divider 38. The NOR gate 39 provides a high level output signal when both input signals are low. An amplifier 41 inverts the output signal from the NOR gate 39 and applies the inverted signal to the gate electrode 20 of the switch 10 to alternately permit or block the flow of current in the circuit between the lamp wink terminals and thereby provide the lamp wink signal to the line card and line selection lamp at the telephone sets.

The output signal from the divider 38 is also supplied to an input circuit to a counter 40 which has a divide by two and a divide by six stage. The counter 40 has an output lead 42 which is buffered by NOR gate 43 and applied to the gate electrode 20' of the switch 10' by amplifier 44 to provide the lamp flash signal. The output signal on lead 42 is also applied as an input signal to a succeeding stage of the counter as will be discussed in more detail in reference to FIG. 5.

Figure 2:
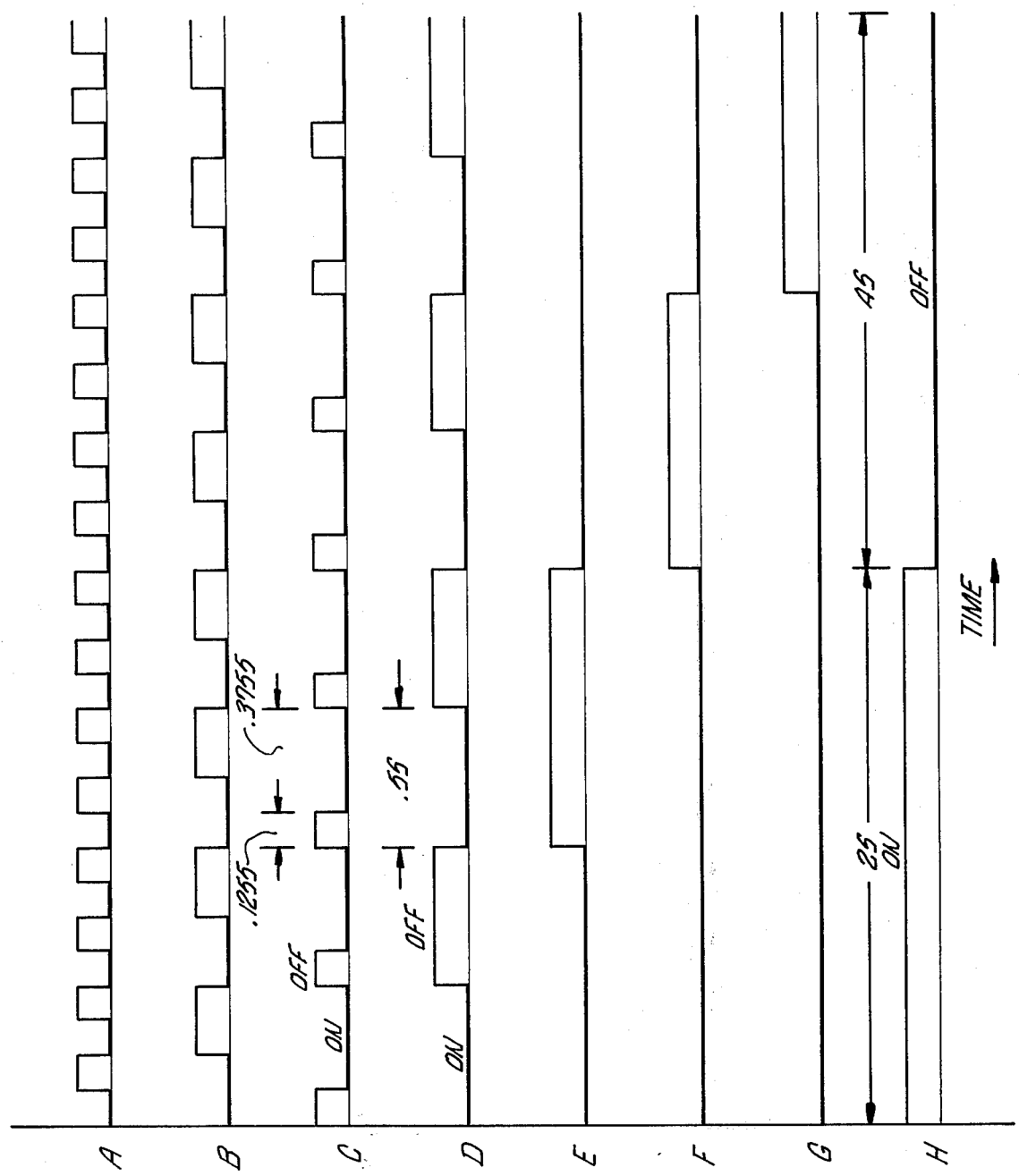
FIG. 2 is a timing waveform diagram illustrating the operation of the circuit of FIG. 1.

The counter 40 includes an additional output terminal 46 which is not used but is shown to illustrate the source of one of the waveforms of FIG. 2. The counter 40 includes two additional output terminals 48 and 50 which are connected to the inputs of a two input positive NOR gate 52. The output signal from the NOR gate 52 is applied to the control circuit 32 of the switch 22 by amplifier 54 to cause the switch 22 to alternately make and break the current between the ring signal terminals.

Referring now to the timing waveform diagram of FIG. 2, the waveform A represents the output signal from the oscillator 34. Waveform B represents the output signal from the divider 38 and the waveform C illustrates the output signal from the NOR gate 39. The high level portion of signal C has a time duration of ⅛th of a second and the low level portion of signal C has a time duration of ⅜ths of a second. The output signal C from the NOR gate 39 is inverted to provide a positive signal for ⅜ths of a second and a zero signal for ⅛th of a second on the gate electrode 20 to cause the switch 10 to permit the flow of current in the circuit between the lamp wink terminals at a frequency of 2 Hz and with a duty cycle of 75%, that is, with the "switch closed" 75% of the time.

Figure 3:
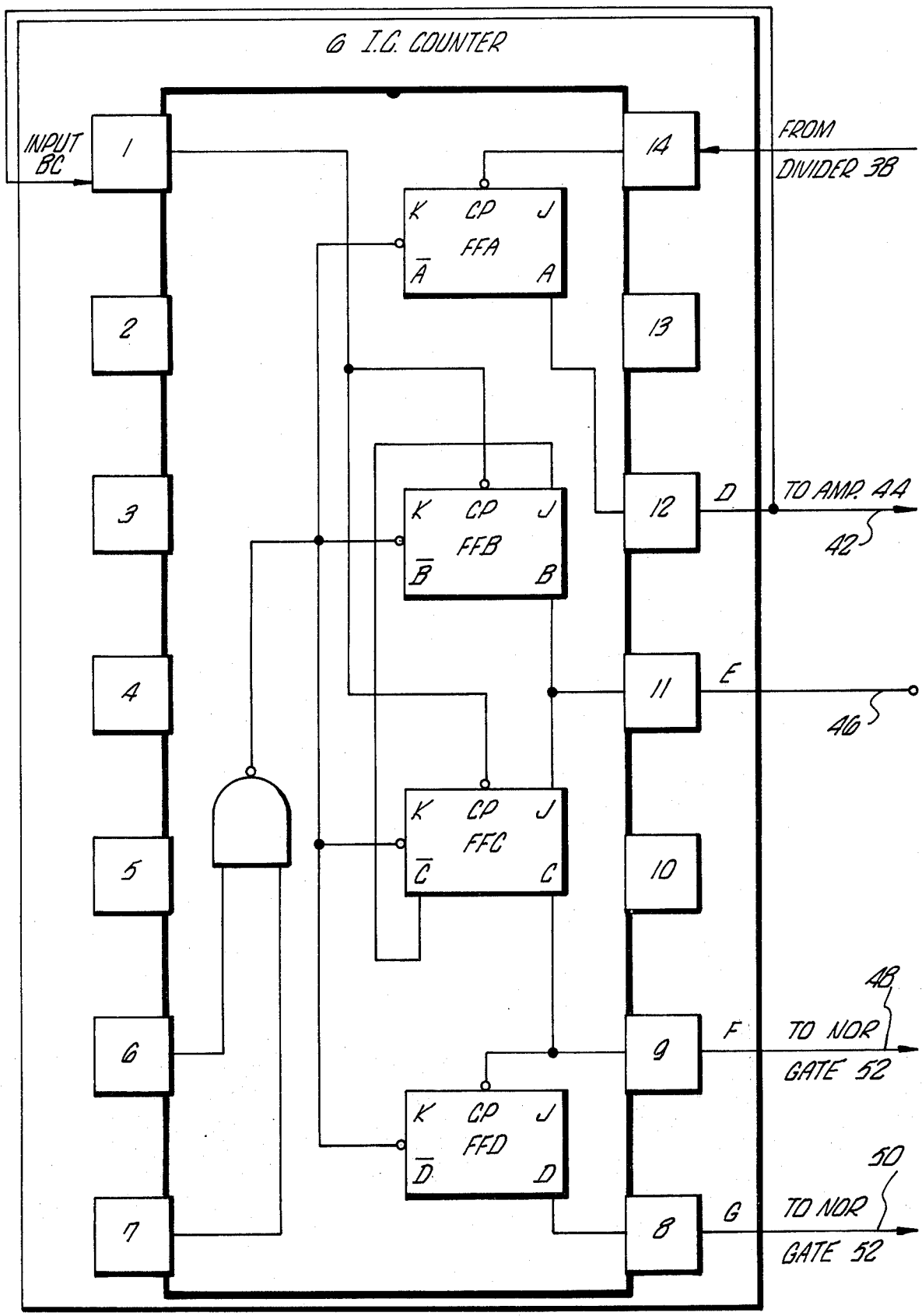
FIG. 3 is a block diagram of an integrated circuit of a counter which may be employed in the circuit of FIG. 1.

Referring now to FIG. 3, there is illustrated an integrated circuit module, containing a divide by 6 counter and a divide by two counter that may be employed for the element 40 in FIG. 1. Such a counter is manufactured by International Telephone and Telegraph Company under the product number ITT 7492. The counter includes several JK flip-flops designated FFA, FFB, FFC and FFD and a NAND gate to provide the output signals at its terminals 12, 11, 9 and 8 which correspond to the waveforms D, E, F and G of FIG. 2. The input to the counter is applied to terminal 14 from the divider 38. The divide by two output signal on terminal 12 (lead 42) is applied to the terminal 1 as shown, as well as to NOR gate 43.

Referring again to FIG. 2, the signal on the output lead 42 of the counter 40 is represented by waveform D of FIG. 2. The signal D has a frequency of 1 Hz with a duty cycle of 50% and is applied to the gate electrode 20' by amplifier 44 to operate the switch 10' with a 4/8ths of a second on and 4/8ths of a second off repetition rate. Thus, the energy supplied to the line selection lamp through the line card switch to provide the flashing signal has a one-half second on time and a one-half second off time.

The waveform E in FIG. 2 represents the signal obtained on output terminal 46 from the counter 40 and represents the signal D on output lead 42, divided by two. The waveform F of FIG. 2 represents a signal which is generated within the integrated circuit counter 40. The high level portion of signal F is initiated by the next CP signal transition (input signal to terminal 1, FIG. 3) following the high level portion of signal E which enables the J input to the flip-flop FFD. By a similar action the flip-flop FFB is prohibited from going to the high level with the next CP signal transition, by the low level signal to the J input to flip-flop FFB derived from the c output of the flip-flop FFC. However, the flip-flop FFC is permitted to toggle to the low level at the same CP signal transition by the high level signal applied to the K terminal of the flip-flop FFC.

The waveform G of FIG. 2 represents the signal on output lead 50 of the counter 40 and is the signal E divided by two. The waveform H of FIG. 2 represents the output signal from the NOR gate 52. This control signal H when applied to the control circuit 32 permits and blocks the flow of current through the circuit across the output terminals 24 and 26 for two seconds and four seconds, respectively.

Figure 4:
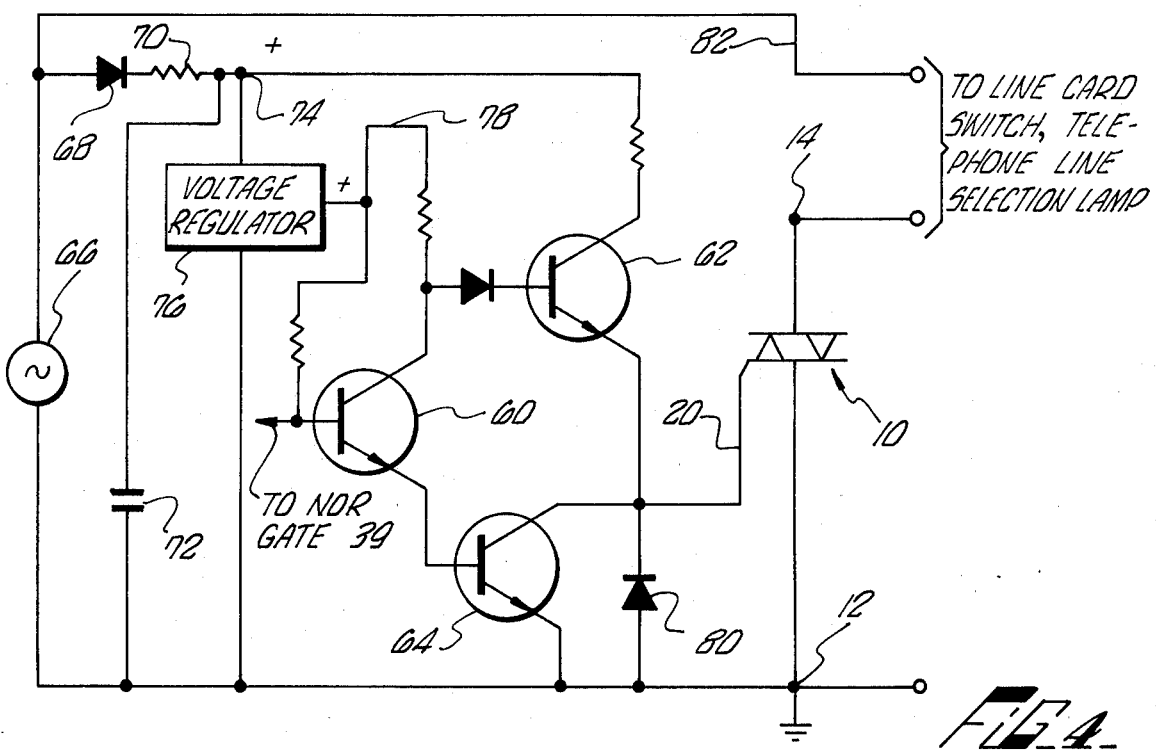
FIG. 4 is a schematic circuit diagram of an amplifier which may be employed in the circuit of FIG. 1.

FIG. 4 represents a schematic diagram of an amplifier which may be used as the amplifiers 41 and 44 of FIG. 1. FIG. 4 also illustrates a power supply for providing bias potential for the amplifier (and other components in the interrupter) and a source of a.c. power for the telephone set line selection lamps. The amplifier of FIG. 4 includes transistors 60, 62 and 64. Bias potential is provided for the transistors by means of a 10 volt 50-60 cycle Hz source 66, a rectifier 68 and a filter comprising resistor 70 and a capacitor 72. The voltage on lead 74 of the power supply is approximately 4 volts d.c.. A suitable voltage regulator 76 is connected to the lead 74 to provide a 5 volt d.c. regulated voltage on lead 78.

The input signal to the amplifier (i.e., output from NOR gate 39) is applied to the base electrode of the transistor 60. The transistor 60 is rendered conducting by a high level input signal and is rendered nonconducting by a low level input signal. The transistor 64 is turned on (rendered conducting) when the transistor 60 is conducting to provide a low level (zero) signal on the gate electrode 20 of the switch 10 to cause the switch 10 to block the flow of current through the circuit between the output terminals 12 and 14. When the transistors 60 and 64 are rendered nonconducting by a low level input signal, a high level signal (control signal) is applied to the gate electrode 20 to cause the switch 10 to permit the flow of current through the circuit between the output terminals 12 and 14. The transistor 62 is rendered conducting when the transistors 60 and 64 are rendered nonconducting and vice versa to provide the gate current for the switch 10 in a well known manner. A diode 80 is connected between the gate electrode 20 and at the output terminal 12 to prevent the gate electrode from going negative with respect to this output terminal.

In the circuit shown in FIG. 4 a common power supply 66 is employed to supply the energy to the line selection lamps and the bias potential to the solid state interrupter circuit including the amplifiers 41 and 44. A common lead 82 is connected between the power supply 66 and the line selection lamps of the telephone.

Figure 5:
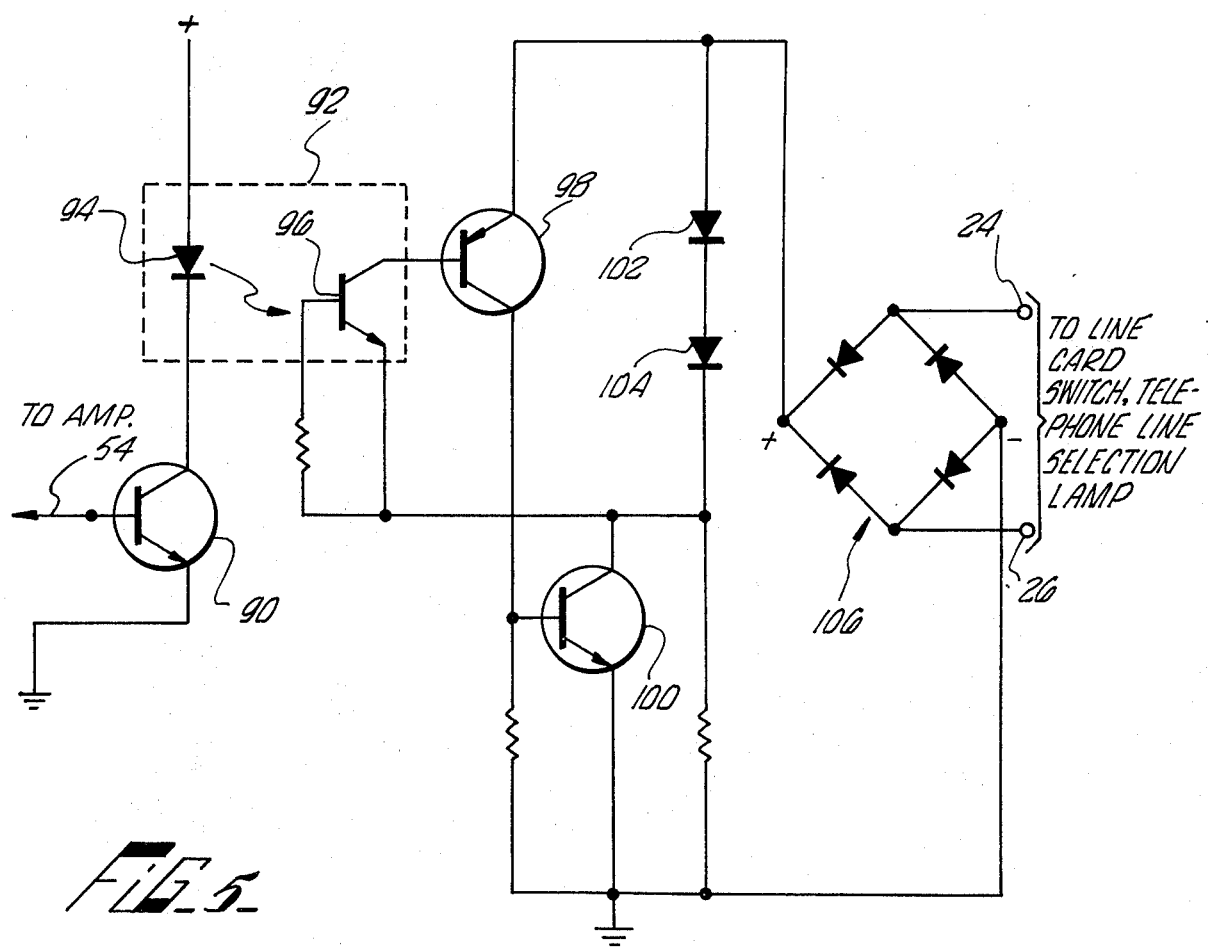
FIG. 5 is a schematic circuit diagram of an electro-optical isolator switch which may be employed in the circuit of FIG. 1.

Referring now to FIG. 5, there are illustrated circuit components which may be used for the electro-optical isolator switch 22 of FIG. 1. A transistor 90 functions as a switch with its base electrode connected to the output of amplifier 54 which is connected to the NOR gate 52, and its emitter electrode connected to ground. A photo transistor optical isolator element 92 provides electrical isolation between the interrupter circuit and the source of potential for the telephone ringers. The isolator element 92 may be of the type manufactured by Monsanto Company under the product number MCT 26. The isolator element includes a light emitting diode 94 connected in series with the transistor switch 90. A light responsive transistor 96 is included in the isolator element 92 and arranged so that the impedance between the collector and emitter electrodes thereof is low in response to a high level output signal from NOR gate 52, e.g., transistor 90 conducting and current flowing through the light emitting diode 92. When the transistor 90 is not conducting, e.g., in response to a low level output signal from the NOR gate 52, the impedance between the collector and emitter electrodes of the transistor 96 is very high. A pair of transistors 98 and 100 are connected to the collector and emitter electrodes of the transistor 96 as illustrated. A pair of bias diodes 102 and 104 are connected in series with the collector and emitter electrodes of the transistor 100. A full wave rectifier bridge 106 is connected between the switch output terminals 24 and 26 and the transistors 98 and 100 as shown to provide d.c. current through the transistors 98 and 100 in response to a.c. current applied to the terminals 24 and 26 in a well known manner.

The bias voltage across the diodes 102 and 104 causes the transistor 98 to turn on when the impedance across the light responsive transistor 96 is low. The transistor 98 in its conductive state also turns on the transistor 100 which operates as a switch to conduct the current from the ringing voltage source, e.g., 70–120 volts at 20–30 Hz, through the isolator switch, the electromechanical ringer in the telephone and line card switch to provide a ringing signal having a duty cycle of 33% and a frequency of 1/6th Hz. It should be noted that if desired a gate controlled semiconductor switch similar to the switch 10 could be used in place of the rectifier bridge 106 and transistor switch 100 in a well known manner.

A simple, reliable and compact solid state interrupter has been described for controlling the current to the lamp wink, lamp flash and ringer terminals in key system telephone sets.

What is claimed is:

1. In an interrupter for alternately enabling and blocking the flow of current in the circuits between a plurality of pairs of terminals to control the visual and audible indicators in key telephone sets, the combination which comprises:

switching means individually connected between each pair of terminals, each switching means including a control circuit and being arranged to permit the flow of current in the circuit between the respective pair of terminals in response to the application of a first control signal to the control circuit thereof and to block the flow of current in the respective circuit between the terminals in the absence of the first control signal;

oscillator means for generating an a.c. reference signal having a preselected frequency; and control means coupled between the oscillator means and each of the switching means for applying a control signal to each switching means at a predetermined frequency and for a predetermined time period for controlling the frequency and time period when the circuit between each respective pair of terminals is enabled.

2. The combination as defined in claim 1 wherein the switching means connected between one pair of terminals is arranged to provide electrical isolation between the terminals and the control circuit thereof.

3. The combination as defined in claim 2 wherein the oscillator means is arranged to produce a square wave reference signal and wherein the control means includes at least one frequency divider.

4. The combination as defined in claim 1 wherein the pairs of terminals comprise a pair of lamp wink terminals, a pair of lamp flash terminals and a pair of ringing signal terminals, and wherein the control means is arranged to provide a control signal having a unique waveform for each of the switching means whereby the frequencies and duty cycles that the circuits are enabled between the lamp wink, lamp flash and ringing signal terminals are different.

5. The combination as defined in claim 4 wherein each of the switching means connected between the lamp wink and lamp flash terminals comprise gate controlled, semiconductor switches.

6. The combination as defined in claim 5 wherein the switching means connected between the ringing signal terminals includes a photo transistor optical isolator element for providing electrical isolation between the ringing signal terminals and the control circuit of the switching means.

7. The combination as defined in claim 6 wherein the control means includes a divide by six counter coupled between the oscillator means and the control circuit of the switching means connected between the ringing signal terminals.

8. In an interrupter for alternately enabling and blocking the flow of current in the circuit between a pair of telephone lamp wink terminals, a pair of telephone flash terminals and a pair of telephone ringing signal terminals for controlling the visual and audible indicators in key telephone sets, the combination which comprises:

first, second and third switching means, each switching means including a pair of output terminals and a control circuit and being arranged to enable the circuit between the output terminals thereof in response to the application of a first control signal to the control circuit thereof and to block the circuit between the terminals in the absence of the first control signal;

means for connecting the output terminals of the first, second and third switching means to the lamp wink, lamp flash and ringing signal terminals, respectively;

an oscillator for generating a square wave reference signal having a preselected frequency;

control means connected between the oscillator and the first, second and third switching means for applying a first, second and third control signal to the control circuits of the first, second and third switching means, respectively, to cause the first, second and third switching means to alternately enable and block the flow of current between the lamp wink, lamp flash and ringing signal terminals at first, second and third frequencies and time periods, respectively.

9. The combination as defined in claim 8 wherein the third switching means is arranged to provide electrical isolation between the control circuit and the output terminals thereof.

10. The combination as defined in claim 9 wherein the third switching means includes a photo transistor optical isolator element.

11. The combination as defined in claim 9 wherein each of the first and second switching means comprise gate controlled semiconductor switches.

12. The combination as defined in claim 11 wherein the control means includes a divide by six counter.

* * * * *